United States Patent
Kabat et al.

(12) 
(10) Patent No.: US 6,711,491 B2
(45) Date of Patent: Mar. 23, 2004

(54) MASS AIRFLOW SENSOR FOR PULSATING OSCILLATING FLOW SYSTEMS

(75) Inventors: Daniel Michael Kabat, Oxford, MI (US); Xiaoguo Tang, Canton, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 169 days.

(21) Appl. No.: 09/682,984

(22) Filed: Nov. 5, 2001

(65) Prior Publication Data

US 2003/0088356 A1 May 8, 2003

(51) Int. Cl.⁷ .................................................. F02D 41/18
(52) U.S. Cl. ........................ 701/103; 701/114; 73/1.34; 123/488
(58) Field of Search ................................ 701/101–103, 701/114, 115; 123/488, 494; 73/1.34, 118.2

(56) References Cited

U.S. PATENT DOCUMENTS

| | | | |
|---|---|---|---|
| 4,966,033 A | | 10/1990 | Nishimura et al. |
| 5,353,765 A | * | 10/1994 | Saikalis et al. ............. 123/438 |
| 5,668,313 A | | 9/1997 | Hecht et al. |
| 5,794,596 A | * | 8/1998 | Butler et al. ................ 123/488 |
| 5,832,403 A | | 11/1998 | Kowatari et al. |
| 6,381,548 B1 | * | 4/2002 | Van Marion et al. ......... 702/45 |

* cited by examiner

*Primary Examiner*—Andrew M. Dolinar

(57) ABSTRACT

A method for calibrating an output signal of a mass airflow (MAF) sensor in operative communication with an induction system of an internal combustion engine is provided. The method comprises the steps of determining an engine speed value, determining a maximum MAF output signal value at the engine speed value, detecting a mean MAF output signal value at the engine speed value, and correlating the MAF output signal with an airflow rate value as a function of the MAF output signal value, mean MAF output signal value and engine speed. The present invention is particularly suited to improving the MAF sensor output of internal combustion piston engines having pulsating airflow including gaseous-fueled engines.

14 Claims, 2 Drawing Sheets

MASS AIRFLOW SENSOR FOR PULSATING OSCILLATING FLOW SYSTEMS

BACKGROUND OF INVENTION

1. Technical Field

The present invention relates to engine control systems, and more particularly concerns a mass airflow sensor calibration scheme for pulsating oscillatory flow systems such as reciprocating internal combustion engines.

2. Background

Most internal combustion engines use a mass airflow (MAF) sensor to measure airflow, because it has a fast response and communicates fresh air information directly. Air fuel ratio control for internal combustion engines is directly dependent upon an accurate measurement of mass airflow. MAF sensors work on the principal of a hot-wire anemometer. MAF sensors are heat transfer-based sensors using constant current or constant temperature principals. Thus, as the mass flow of air passing over the hot-wire increases, so does the heat transfer between the wire and the air, resulting in a lower wire temperature and correspondingly higher electrical resistance. The sensor circuitry automatically compensates the current associated with the wire that is reduced by the increased resistance. In this way, the MAF sensor senses the local fluid velocity at the point where the MAF sensor is located.

To indicate the flow rate, the representative velocity and velocity distribution must be known. In the unidirectional, constant flow or semi-constant flow situation, both the airflow velocity and distribution are functions of the Reynolds number. Thus, the MAF sensor signal is calibrated at varied constant steady flow rates using sensor output voltage mean values or modified mean values that are strongly correlated with Reynolds numbers. This procedure provides good accuracy in measuring constant unidirectional flow (DC flow), since the airflow is steady, and the hot-wire boundary layer remains unchanged. Hence, the heat transfer on the hot-wire surface can be described by the equation $Nu=f(Re, Pr)$, where Re represents the Reynolds number and Pr represents the media property such as the Prandtl number (kinematic viscosity divided by thermal diffusivity). Similarly, the flow rate is a function of the MAF sensor voltage.

For internal combustion engine applications, the actual airflow in the induction system is not a unidirectional or DC flow. Engine airflow pulsates due to piston movement, valve events, and in the case of gaseous fuel such as hydrogen or CNG, fuel injection events. Even when the engine speed (RPM) is stable, the airflow velocity is oscillatory. Resulting pulsating flow creates boundary layer disturbances that steady flow heat transfer correlations cannot accurately describe. One exception is when engine operation occurs under heavily throttled conditions such that the flow pulsations dampen out sufficiently to allow constant flow heat transfer to adequately approximate the boundary layer physics. Only under severely throttled conditions, however, do DC flow-calibrated MAF sensors provide reasonable accuracy.

When the engine throttle angle is greater than 25°, or under unthrottled conditions such as in lean burn gasoline engines and diesel engines, the airflow oscillation effects can result in large MAF sensor errors due to the sensor calibration being based upon the mean signal value. If the airflow signal error is too great, most engine control systems ignore the MAF sensor signal and operate under open loop control or estimate airflow by other methods which can result in higher emissions and reduced performance.

Accordingly, there exists a need for an improved mass airflow sensor calibration methodology for pulsating, oscillating flow systems such as reciprocating internal combustion engines and gaseous-fueled engine systems, in particular.

SUMMARY OF INVENTION

The present invention overcomes the drawbacks associated with prior art mass airflow sensors through the provision of a new method of measuring internal combustion engine pulsating flow based upon oscillation flow and heat transfer theory. In this regard, the present invention presents an oscillation-flow heat transfer model of airflow characterized by three parameters: a mean Reynolds number, a dynamic Reynolds number indicative of frequency or engine speed, and a dimensionless amplitude indicating the extent to which the airflow pulsation flow deviates from the mean velocity. The present MAF sensor calibration scheme is then implemented as a function of the mean sensor signal, the ratio of the maximum sensor signal to the mean sensor signal, and the engine speed. For oscillatory flow, the engine speed is indicative of how often the boundary layer is disturbed, while the ratio is indicative of how much the boundary layer is disturbed.

In one embodiment, a method for calibrating an output signal of a mass airflow (MAF) sensor in operative communication with an induction system of an internal combustion engine system is provided. The method comprises the steps of determining an engine speed value, determining a maximum MAF output signal value at the engine speed value, detecting a mean MAF output signal value at the engine speed oscillation ratio, and correlating the MAF output signal with an airflow rate value as a function of the MAF output signal value, mean MAF output signal value and engine speed.

One advantage of the present invention is that it is applicable to all internal combustion engines including diesel engines and gaseous-fueled engine systems.

Another advantage of the present invention is that it reduces MAF sensor signal error due to airflow oscillation.

Other advantages of the invention will become apparent upon reading the following detailed description and appended claims, and upon reference to the accompanying drawings.

BRIEF DESCRIPTION OF DRAWINGS

For a more complete understanding of this invention, reference should now be made to the embodiments illustrated in greater detail in the accompanying drawings and described below by way of examples of the invention.

In the drawings.

DETAILED DESCRIPTION

Figure 1:
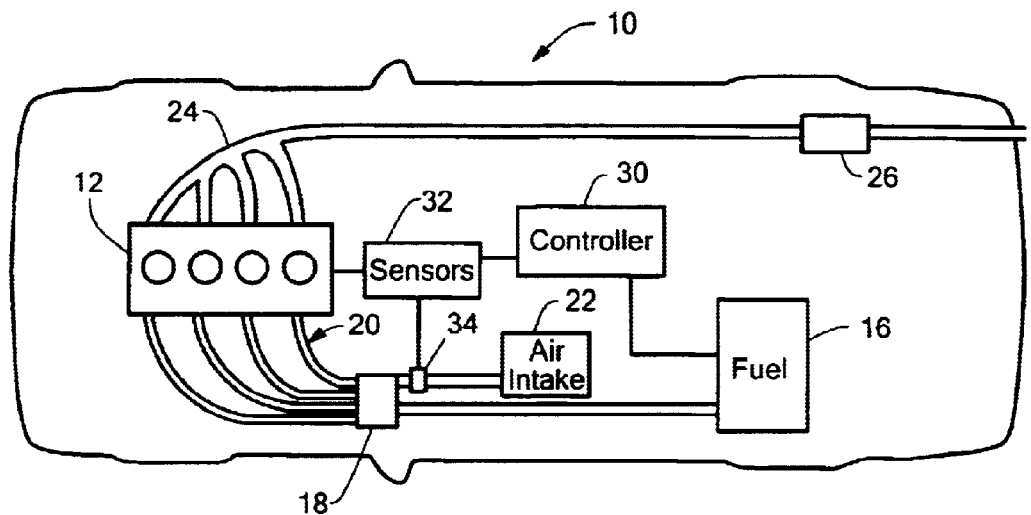
FIG. 1 is a schematic block diagram of a gaseous-fueled engine and corresponding control system in accordance with one embodiment of the present invention.

Referring now to FIG. 1 there is shown a schematic diagram of an example of a gaseous-fueled engine system wherein the present MAF sensor calibration scheme may be used to advantage. The scheme disclosed herein applies to any pulsating, oscillating flow system. Thus, while the present invention is described with respect to a gaseous-fueled engine system, the present MAF sensor calibration scheme is equally applicable to any IC engine system including gasoline and diesel fueled engine systems. It is also applicable to rotary (Wankel) engines, as well. As shown in FIG. 1, the gaseous fueled engine system 10 includes a gaseous fueled internal combustion engine 12 and gaseous fuel system 16 which provides fuel to the engine 12 such as hydrogen by way of injection system 18 and intake manifold 20. Air is also conveyed to the engine cylinders by way of air intake 22. After combustion, the spent fuel and air is exhausted by exhaust manifold 24 through the emissions system 26 out the tailpipe 28.

Controller 30 is adapted to receive a plurality of signals from sensors 32 which monitor various engine parameters to maintain the engine 12 at desired operating set points as is known in the art based upon the engine operating conditions and the driver demand. These signals include such things as engine speed, intake air temperature and pressure, and driver demand. Controller 30 is preferably a microprocessor based controller such as a computer having a central processing unit, memory in the form of RAM and/or ROM, associated inputs and outputs, and a communication bus. The sensor set 32 and the controller 30 are conventional. The control scheme, however incorporates mass airflow data as received from mass airflow sensor 34 which is calibrated in accordance with the present invention as described below.

The MAF sensor 34 is a hot-wire anemometer-type MAF sensor with associated circuitry as is known in the art. Thus, the MAF sensor 34 outputs a voltage signal in relation to the heat transfer through the sensor wire which is within the intake airflow.

Figure 2:
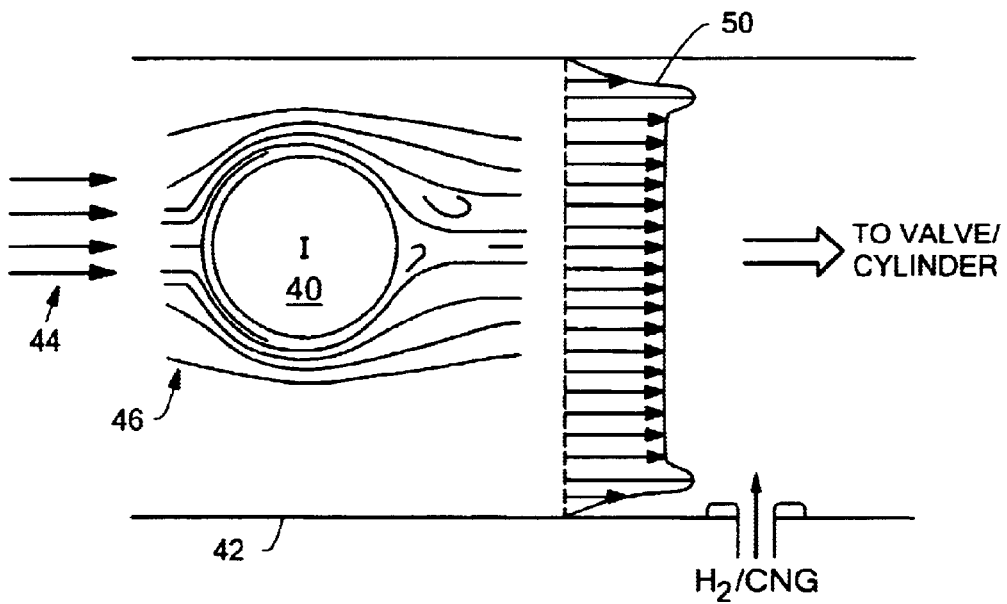
FIG. 2 is schematic diagram of a pulsation flow velocity profile around a MAF sensor in the engine control system of FIG. 1.

Referring now to FIG. 2 there is shown a schematic diagram of the heat transfer characteristics for an IC engine with oscillatory airflow such as the gaseous-fueled part fuel injected (PFI) engine of FIG. 1. The hot-wire of the MAF sensor 34 with current (I) flowing therethrough is represented in cross-sectional view as wire 40. The wire 40 is within the intake manifold 42 of the IC engine. Incoming air 44 is disturbed by MAF sensor wire 40 to create a boundary layer characteristic shown as 46 about the wire 40. The hot-wire surface boundary layer 46 is disturbed by pressure waves periodically reflecting back from the action of the closing valves and pistons downstream. The boundary layer 46, however, determines the heat transferred from the wire 40 into the passing air 44 and, correspondingly the sensor output. Therefore, how often the boundary layer is disturbed and the magnitude of the boundary layer disturbance must be considered in the heat transfer function. The frequency of the boundary layer disturbance, since it is related to engine valving, is a function of the engine speed (RPM).

Pressure waves are also reflected towards the hot-wire in the case of gaseous PFI fueled engines during the injection of the gaseous fuel which can represent a significant volume of the inducted flow into the cylinders as compared to liquid fueled engines. The gaseous injection event, like the valving action, is also related to the engine speed. The magnitude of the boundary layer disturbance is also be described as a ratio of the voltages resulting from the current fluctuations through the wire 40 as the airflows.

During oscillatory airflow, an annular effect could be observed which is schematically represented as arrows 50 wherein the maximum flow velocity is near the walls of the intake manifold 42 at a certain moment. It is this annular effect 50 which contributes to large errors in unidirectional or DC flow-based MAF sensor calibration schemes because the flow velocity profile is constantly changing.

For constant unidirectional flow across a hot-wire, i.e. conventional MAF sensor calibration, the hot-wire boundary layer remains unchanged. Hence, the heat transfer on the hot-wire surface can be described according to equation (1):

$$Nu = f(Re, Pr) \tag{1}$$

where Re is the Reynolds number, and Pr represents mean velocity profile which is stable when temperature change is not significant. The resulting heat transfer flow rate for the conventional MAF sensor is then a function of the wire voltage:

$$\text{Flow rate} = f(V_{MAFS}) \tag{2}$$

Figure 3:
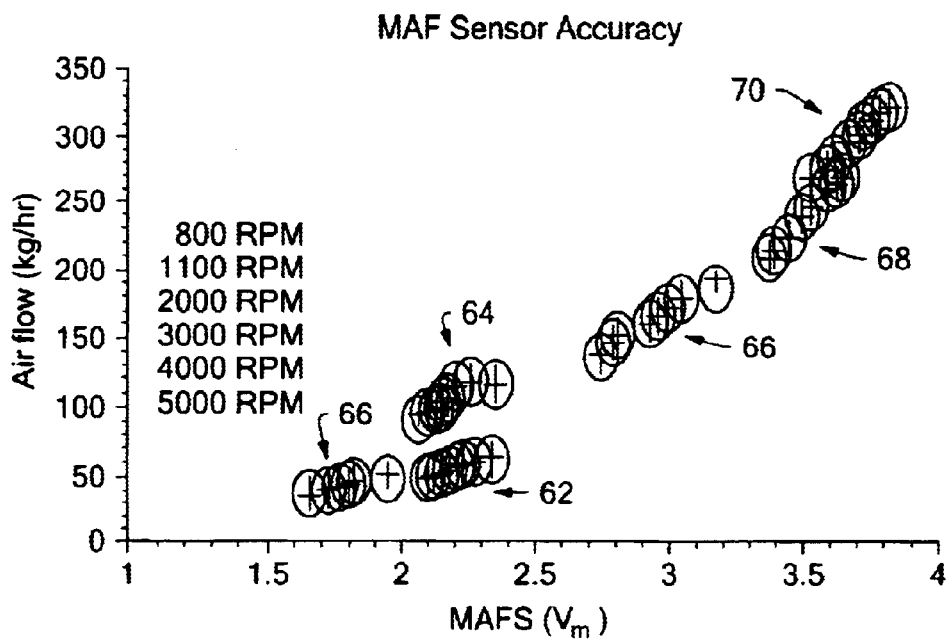
FIG. 3 is a graph of engine airflow versus MAF sensor voltage for a MAF sensor calibrated according to the prior art.

Referring now to FIG. 3 there is shown a graph of airflow versus MAF sensor voltage for a conventional MAF sensor calibrated according to equation 2 when used in a reciprocating IC engine with oscillatory airflow near wide-open throttle. The grouped data points of FIG. 3 represent airflow and voltage values for various engine speeds. As can be seen by data groups 60, 62 and 64 which represent engine speeds of 800 RPM, 1100 RPM and 2000 RPM, respectively, significant errors can occur for MAF sensor voltage outputs for significantly different airflow rates. At higher engine speeds of 3000 RPM (data group 66), 4000 RPM (data group 68), and 5000 RPM (data group 70), the relationship between actual airflow and MAF sensor voltage output is less effected by the oscillatory component.

To overcome the error associated with conventional MAF sensor calibration schemes when used in oscillatory airflow environments, the present invention defines the heat transfer function associated with oscillating airflow as follows:

$$Nu = f(Re, Re_w, Aw, Pr) \tag{3}$$

where $Re_w$ is a dynamic Reynolds number which represents a dimensionless frequency, and $A_w$ is a dimensionless amplitude. Correspondingly, the heat transfer-based MAF sensor has a similar expression for flow rate:

$$\text{Flow rate} = f(Re, Pr, Re_w, Aw) \tag{4}$$

In the case of an IC engine, $Re_w$ is indicated by engine speed measured as RPM. Similarly, the amplitude Aw is defined as a ratio:

$$Vr = (V_{MAX} V_{MEAN})/V_{MEAN} \tag{5}$$

Or $$Vr = V_{MAX}/V_{MEAN} \tag{6}$$

where $V_{MAX}$ is the MAF sensor cyclic peak voltage value and $V_{MEAN}$ is the mean voltage value for a given engine speed. The corresponding airflow equation is thus:

$$\text{Flow rate} = f(V_{MEAN}, Vr, RPM) \tag{7}$$

That is, under oscillating airflow conditions, MAF sensor calibration is a function of the MAF sensor output voltage mean value, oscillation amplitude (voltage ratio), and frequency (engine RPM).

Figure 4:
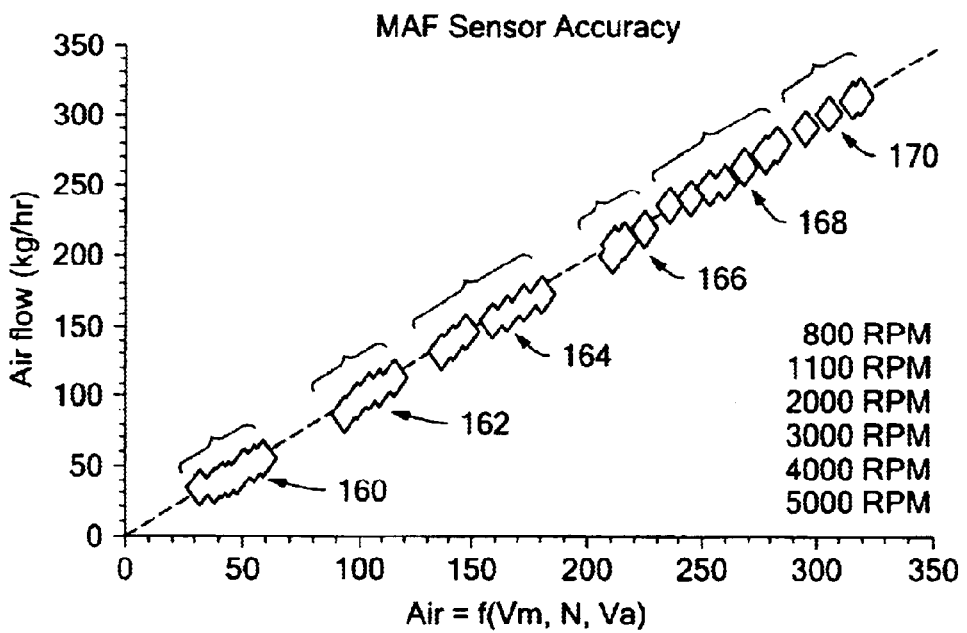
FIG. 4 is a graph of engine pulsation flow versus measured engine airflow using the MAF sensor calibration scheme according to the present invention.

Referring now to FIG. 4 there is shown a graph of measured airflow versus actual airflow for a MAF sensor calibrated according to equation 7. Corresponding engine RPM data point groupings are indexed by 100 with respect to the engine data point groupings of FIG. 3. As can be seen in FIG. 4, the measured accuracy for the oscillatory airflow is improved dramatically. Thus, for gasoline throttled and unthrottled engine operating conditions, gaseous fueled engine systems, and diesel engine systems, the MAF sensor accuracy for a given engine control scheme can be improved significantly.

To calibrate the sensor, the linear relationship between actual airflow and sensor output is determined experimentally using equation (7) at various engine speeds. Given the relationship between actual and measured airflow such as in FIG. 4, the sensor can then be used to dynamically indicate the intake airflow rate. Alternatively, these values can be stored in a lookup table of values accessible by the controller. Thus, for a given MAF sensor output voltage and engine speed, the engine controller would lookup, or directly calculate, the corresponding airflow rate as determined by equation (7).

The MAF signal processing can occur either at the sensor 32, in the main controller 30, or in a separate controller which may or may not be part of the main controller 30. At the sensor, the MAF sensor could be configured to output the voltage mean and the ratio for communication to the controller. Alternatively, a signal conditioning processor can be implemented between the MAF sensor and controller to determine the voltage mean and ratio and communicate the information to the controller. Finally, the controller itself could read the MAF sensor data and determine the voltage mean and ratio for use in the calibration scheme.

From the foregoing, it can be seen that there has been brought to the art a new and improved MAF sensor calibration scheme which overcomes the drawbacks associated with conventional MAF sensor calibration schemes. While the invention has been described in connection with one or more embodiments, it should be understood that the invention is not limited to those embodiments. On the contrary, the invention covers all alternatives, modifications and equivalents as may be included within the spirit and scope of the appended claims.

What is claimed is:

1. A method for calibrating an output signal of a mass airflow (MAE) sensor in operative communication with an induction system of an internal combustion engine system comprising:

determining an engine speed value;

determining a maximum MAF output signal value at said engine speed value;

detecting a mean MAF output signal value at said engine speed value; and correlating said MAF output signal with an airflow rate value as a function of said maximum MAF output signal value, mean MAF output signal value and engine speed; and wherein
      correlating includes generating a MAF output signal ratio and generating an airflow rate value as a function of said MAF output signal ratio, mean MAF output signal value and engine speed.

2. The method of claim 1 wherein generating a MAF output signal ratio comprises dividing a difference between said maximum MAF output signal value and mean MAF output signal value by said mean MAE output signal value.

3. The method of claim 1 further comprising using a control device of the internal combustion engine as the determining device.

4. The method of claim 1 further comprising calibrating said MAF output signal for a plurality of engine speed values.

5. The method of claim 4 further comprising storing said correlated MAF output signals in a control device of the internal combustion engine.

6. A method of controlling an internal combustion engine system as a function of a mass airflow (MAF) sensor output signal comprising:

determining an engine speed value; determining a maximum MAF output signal value at said engine speed value;

detecting a mean MAF output signal value at said engine speed value; and correlating said MAF output signal with an airflow rate value as a function of said maximum MAF output signal value, mean MAF output signal value and engine speed; and adjusting an air-fuel ratio of said engine as a function of operator demand and said airflow rate value; and wherein correlating includes generating a MAF output signal ratio and generating an airflow rate value as a function of said MAF output signal ratio, mean MAF output signal value and engine speed.

7. The method of claim 6 further comprising using a control device of the internal combustion engine as the determining device.

8. The method of claim 6 wherein said internal combustion engine is a gaseous fueled internal combustion engine.

9. The method of claim 6 wherein said internal combustion engine is a diesel-fueled internal combustion engine.

10. A method of controlling an internal combustion engine system as a function of a mass airflow (MAF) sensor output signal comprising:

determining an engine speed value; determining a maximum MAF output signal value at said engine speed value;

detecting a mean MAF output signal value at said engine speed value; and correlating said MAF output signal with an airflow rate value as a function of said maximum MAF output signal value, mean MAF output signal value and engine speed; and adjusting an air-fuel ratio of said engine as a function of operator demand and said airflow rate value; and wherein generating a MAF output signal ratio comprises dividing a difference between said maximum MAF output signal value and mean MAF output signal value by said mean MAF output signal value.

11. An engine system comprising a hot-wire mass airflow (MAF) sensor in operative communication with an intake manifold of said engine, and a controller in operative communication with said MAF sensor for controlling the operation of said engine, said controller including memory programmed to perform the following steps:

determine an engine speed value; determine a maximum MAE sensor output value at said engine speed value;

determine a mean MAF sensor output value at said engine speed value; and generate an intake airflow rate value as a function of said maximum MAF sensor output value, mean MAF sensor output value and engine speed, and wherein the step of generating includes determining a MAF sensor output signal ratio.

12. The system of claim 11 wherein determining a MAF sensor output signal ratio includes dividing a difference between said maximum MAF output signal value and mean MAF output signal value by said mean MAF output signal value.

13. The system of claim 11 wherein said combustion engine is a gaseous-fueled internal engine.

14. The system of claim 11 wherein said engine is a diesel-fueled engine.

* * * * *